(12) United States Patent
Fu et al.

(10) Patent No.: US 9,514,522 B2
(45) Date of Patent: Dec. 6, 2016

(54) DEPTH DATA PROCESSING AND COMPRESSION

(75) Inventors: Jingjing Fu, Beijing (CN); Yan Lu, Beijing (CN); Shipeng Li, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 683 days.

(21) Appl. No.: 13/593,610

(22) Filed: Aug. 24, 2012

(65) Prior Publication Data

US 2014/0055560 A1 Feb. 27, 2014

(51) Int. Cl.
G06K 9/00 (2006.01)
G06T 5/00 (2006.01)
H04N 13/00 (2006.01)
H04N 13/02 (2006.01)

(52) U.S. Cl.
CPC ........... *G06T 5/005* (2013.01); *H04N 13/0022* (2013.01); *H04N 13/0271* (2013.01); *G06T 2207/10028* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 2006/0034519 A1* | 2/2006 | Toyama | G06K 9/38 382/224 |
| 2009/0016640 A1 | 1/2009 | Gunnewiek et al. | |
| 2010/0215251 A1 | 8/2010 | Gunnewiek et al. | |
| 2010/0302365 A1* | 12/2010 | Finocchio et al. | 348/142 |
| 2011/0080464 A1* | 4/2011 | Alessandrini | G06T 5/005 348/42 |
| 2011/0249190 A1* | 10/2011 | Nguyen | H04N 5/272 348/708 |
| 2011/0317916 A1 | 12/2011 | Zhang et al. | |
| 2012/0306904 A1* | 12/2012 | Francois | G06T 7/0081 345/589 |
| 2013/0100125 A1* | 4/2013 | Zhang et al. | 345/419 |
| 2014/0002604 A1* | 1/2014 | Ohba | H04N 13/0007 348/43 |

OTHER PUBLICATIONS

Bertalmio et al, "Image Inpainting," Proceedings of SIGGRAPH 2000, New Orleans, USA, Jul. 2000, pp. 1-8.
Camplani et al, "Efficient Spatio-Temporal Hole Filling Strategy for Kinect Depth Maps," Three-Dimensional Image Processing (3DIP) and Applications II, Proceedings of SPIE, vol. 8290, Mar. 2012, 10 pgs.
Chai et al, "Depth map compression for real-time view-based rendering," Pattern Recognition Letters, Elsevier, vol., Issue 7, May 2004, pp. 755-766.
Chan et al, "A Noise-Aware Filter for Real-Time Depth Upsampling," ECCV Workshop on Multi-Camera & Multi-Modal Sensor Fusion, Oct. 2008, 12 pgs.

(Continued)

*Primary Examiner* — Weiwen Yang
(74) *Attorney, Agent, or Firm* — Sandy Swain; Micky Minhas; Lee & Hayes PLLC

(57) ABSTRACT

Techniques for setting depth values for invalid measurement regions of depth images are described herein. A computing device may set the depth values based on evaluations of depth values of neighboring pixels and of corresponding pixels from time-adjacent depth images. Alternately or additionally, the computing device may utilize a texture image corresponding to the depth image to identify objects and may set depth values for pixels based on depth values of other pixels belonging to the same object. After setting the depth values, the computing device may normalize the depth values of the pixels. Further, the computing device may generate reduced representations of the depth images based on a depth reference model or a depth error model and may provide the reduced representations to an encoder.

20 Claims, 6 Drawing Sheets

(56) References Cited

OTHER PUBLICATIONS

Chan et al, "Mathematical Models for Local Nontexture Inpaintings," SIAM Journal on Applied Mathematics, vol. 62, No. 3, 2002, pp. 1019-1043.
Chan, "Noise vs Feature: Probalitlistic Denoising of Time-of-Flight Range Data," Stanford University, CS229, 2008, 5 pgs.
Fehn, "Depth-image-based Rendering (DIBR), Compression and Transmission for a New Approach on 3D TV," Proceedings of the SPIE Stereoscopic Displays and Virtual Reality Systems XI, vol. 5291, San Jose, CA, USA, Jan. 2004, pp. 93-104.
Fleishman et al, "Bilateral Mesh Denoising," SIGGRAPH 2003, ACM, Jul. 2003, 4 pgs.
Grewatsch et al, "Evaluation of Motion Compensation and Coding Strategies for Compression of Depth Map Sequences," Proceedings of SPIE, vol. 5561, Oct. 2004, pp. 117-124.
Grewatsch et al, "Fast Mesh-based Coding of Depth Map Sequences for Efficient 3D-Video Reproduction using OpenGL," Proceedings of the Fifth IASTED International Conference Visualization, Imaging, and Image Processing, Benidorm, Spain, Sep. 7-9, 2005, pp. 360-365.
Gumhold et al, "Predictive Point-Cloud Compression," ACM SIGGRAPH 2005 Sketches, Jul. 31-Aug. 4, 2005, 5 pgs.
Kammerl, "Development and Evaluation of Point Cloud Compression for the Point Cloud Library," Institute for Media Technology, TUM, Germany, May 2011, 15 pgs.
"Kinect Depth Inpainting and Filtering," retrieved from <<www.radfordparker.com/papers/kinectinpainting.pdf>>, Oct. 6, 2011, pp. 1-3.
Lee et al, "Joint Multilateral Filtering for Stereo Image Generation using Depth Camera," Lecture Notes in Computer Science (LNCS), Dec. 2011, 10 pgs.
Mehrotra et al, "Low-Complexity, Near-Lossless Coding of Depth Maps from Kinect-Like Depth Cameras," In Proceedings of MMSP, Oct. 2011, 6 pgs.
Schall et al, "Feature-preserving Non-local Denoising of Static and Time-varying Range Data," SPM '07 Proceedings of the 2007 ACM Symposium on Solid and Physical Modeling, Jun. 2007, 6 pgs.
Scharstein et al, "A Taxonomy and Evaluation of Dense Two-Frame Stereo Correspondence Algorithms," International Journal of Computer Vision, vol. 47, Issue 1-3, Apr.-Jun. 2002, pp. 1-35.
Schnabel et al, "Octree-based Point-Cloud Compression," Eurographics Symposium on Point-Based Graphics, Jul. 2006, 11 pgs.
Touma et al, "Triangle Mesh Compression," Proceedings of Graphics Interface, Vancouver, Jun. 1998, 9 pgs.
Verlani et al, "Depth Images: Representations and Real-time Rendering," Proceedings of the Third International Symposium on 3D Data Processing, Visualization, and Transmission (3DPVT'06), Jun. 2006, 8 pgs.
Fu et al, "Kinect-like Depth Compression with 2D+T Prediction," 2012 IEEE International Conference on Multimedia and Expo Workshops (ICMEW), Jul. 2012, 6 pgs.
Fu et al, "Kinect-Like Depth Denoising," 2012 IEEE International Symposium on Circuits and Systems (ISCAS), May 2012, 4 pgs.
Miao et al, "Texture-assisted Kinect Depth Inpainting," 2012 IEEE International Symposium on Circuits and Systems (ISCAS), May 2012, 4 pgs.

\* cited by examiner

DEPTH DATA PROCESSING AND COMPRESSION

BACKGROUND

In the recent decades, various depth cameras have been developed to represent the physical world in a three-dimensional (3D) fashion, such as time-of-light (TOF) cameras, stereo cameras, laser scanners, and structured light cameras. These depth cameras are not as popular as two-dimensional (2D) red-green-blue (RGB) cameras due to their high costs and enormous computing requirements.

The depth cameras each aim to measure the distance from the camera to a target object by utilizing the light wave properties, but their working principles vary. For example, the TOF camera measures the depth by detecting the light wave phase shift after reflection, while the stereo camera generates a disparity map by stereo matching. Depth generated by these different devices exhibits different data characteristics.

In another example, in the structured light camera used by the Kinect® gaming device, depth is derived from the disparity between the projected infrared light pattern and the received infrared light. The granularity and the stability of the received light speckles directly determine the resolution and the quality of the depth data. The captured depth sequence is characterized by its large variation in range and instability. Similar to the depth derived from the stereo video, the Kinect® depth suffers from the problems of depth holes and boundary mismatching due to the deficiency of the received light speckles. Moreover, even if the light speckles have been received by the sensor, the generated depth sequence is unstable in the temporal domain due to the variation of the received light. Depth data is likely to change from time to time, even when representing a static scene. While filtering can be used to improve depth sequences that are unstable in the temporal domain, the depth holes found in these depth images and the error associated with depth measurements often frustrates successful filtering.

In addition, compression of depth data generated by a depth camera, such as the structured light camera used by the Kinect® gaming device, is problematic. The size of the depth data imposes significant transmission and storage costs. While image/video compression methods can, in the abstract, be used for depth data compression, the noise and instability of the depth data associated with the depth images makes actual use of such image/video compression methods problematic.

SUMMARY

In order to improve filtering and compression of depth images, a computing device is configured to set depth values for invalid measurement regions of depth images. The computing device may set the depth values based on evaluations of depth values of neighboring pixels and of corresponding pixels from time-adjacent depth images. Alternately or additionally, the computing device may utilize a texture image corresponding to the depth image to identify objects and may set depth values for pixels based on depth values of other pixels belonging to the same object. After setting the depth values, the computing device normalizes the depth values of the pixels. Further, the computing device then generates reduced representations of the depth images based on a depth reference model or a depth error model and provides the reduced representations to an encoder.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
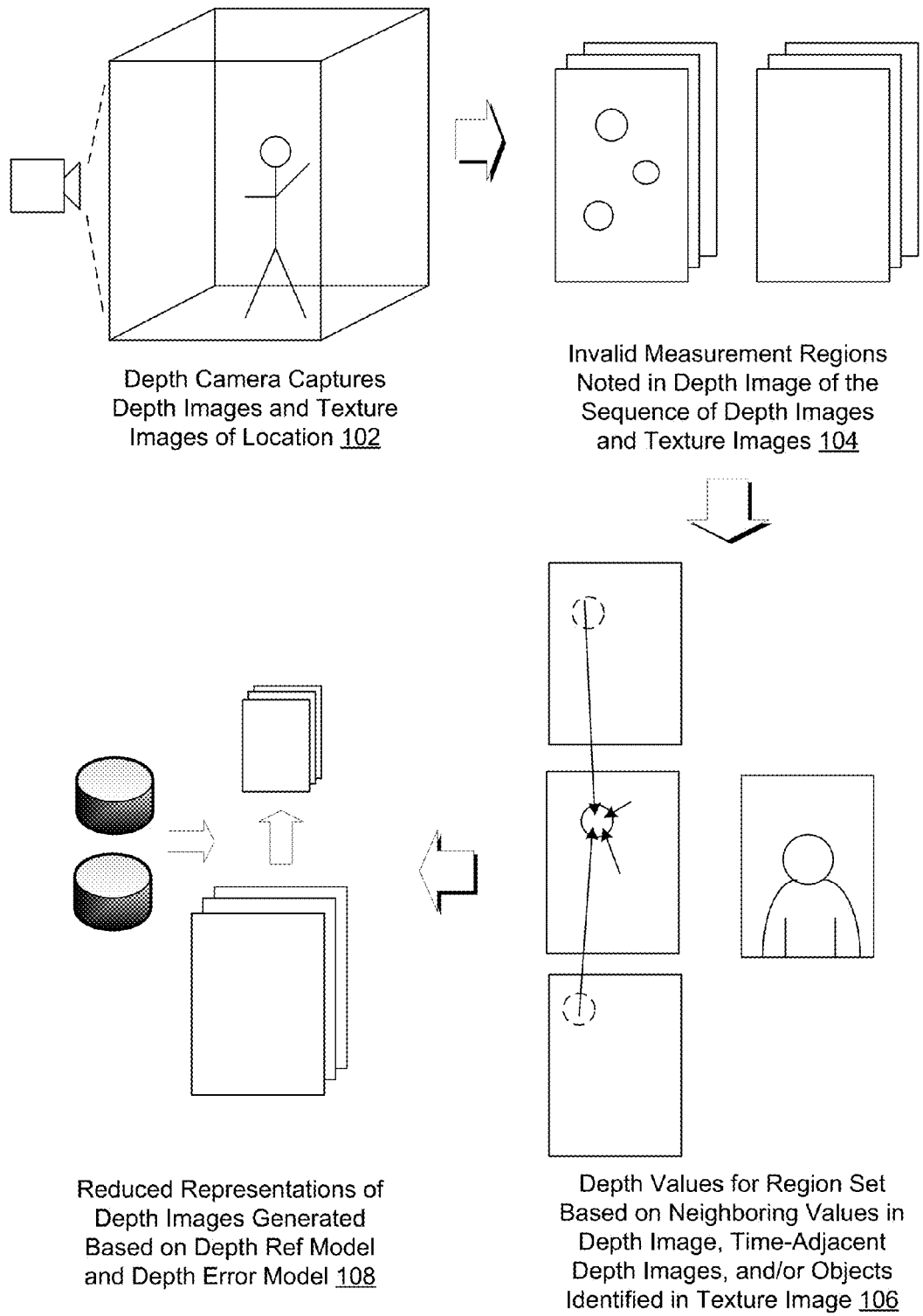
FIG. 1 illustrates an overview of example depth data processing and compression operations.

This disclosure describes, in part, techniques for improving filtering and compression of depth images. As illustrated in FIG. 1 at 102, a depth camera may capture depth images and corresponding texture images of a location, the depth images representing a three-dimensional description of the location, including depth values of objects and a background of the location. The texture images may be corresponding two-dimensional (2D) red-green-blue (RGB) images captured by the depth camera or, alternatively, by another camera configured to capture an image of the same location as the depth camera. In some embodiments, the depth camera is a structured light camera that emits infrared light from an infrared (IR) projector and captures reflected light speckles of the projected infrared light using one or more IR sensors.

In various embodiments, as shown at 104, a computing device associated with the depth camera determines that a depth image of the sequence of depth images and texture images includes one or more invalid measurement regions. These portions of the depth image have invalid depth measurements for any of a number of reasons, such as sensor errors, light condition interference, imaging geometry, or disparity normalization.

As illustrated at 106, the computing device may then set depth values for pixels associated with portions of the depth image that have invalid depth measurements and may filter/normalize those and other pixels of the depth image. Using a first set of techniques, the computing device may calculate an average depth value for the pixels associated with the portions based on depth values of neighboring pixels and may initially set the pixel depth values to the average depth value. This operation is also referred to herein as "padding." The computing device may then calculate a minimum mean square error (MSE) between the average depth value and depth values of corresponding image blocks in time-adjacent depth images. The corresponding blocks may be in the same relative location within the depth images or may be in a different location to reflect motion of a depicted object. The computing device may then set the depth values of the pixels associated with the portions based on the calculated MSEs.

In various embodiments, the computing device may then normalize the depth values of the pixels of the depth image utilizing bilateral filtering. To account for error associated with the depth values, the computing device may set a filter parameter of the bilateral filter based on depth variances associated with the depth values of the pixels. This normalizing/filtering operation is also referred to herein as "denoising."

Using a second set of techniques, also shown at 106, the computing device may perform one or more object recognition operations on the texture image corresponding to the depth image having the invalid measurement regions. These techniques may be used to identify objects in the texture image and locations of edges of those objects. The computing device then uses the locations of the edges to classify portions of the depth image as "smooth regions" or "edge regions." The classifications may occur in a block-by-block fashion with some pixel-by-pixel changes to the classifications in order to center edge regions along the edges. The computing device may then set the depth values of pixels in a smooth region based on the depth values of other pixels belonging to the same smooth region. The edge regions may be divided into segments based on the edge, and depth values of pixels in one segment are set based on the depth values of other pixels belonging to the same segment. These operations are also referred to herein as "inpainting." In some embodiments, these inpainting operations may be supplementary to and occur after the denoising/filtering operations.

As shown at 108, the computing device may then generate reduced representations of the depth images based on a depth reference model and a depth error model and may provide the reduced representations to an encoder for compression. The computing device may first generate the depth reference model through volumetric integration of the depth images. Based on the error model, the computing device may determine if depth values for each pixel are more or less than a threshold differential from the corresponding depth value for that pixel found in the depth reference model. Those less than the threshold are classified as constituting a stable region, while the other pixels constitute a stable region. The computing device then performs a Boolean subtraction of the stable region from the depth image and provides the resultant remainder of the depth image to an encoder for compression.

Example Electronic Device

Figure 2:
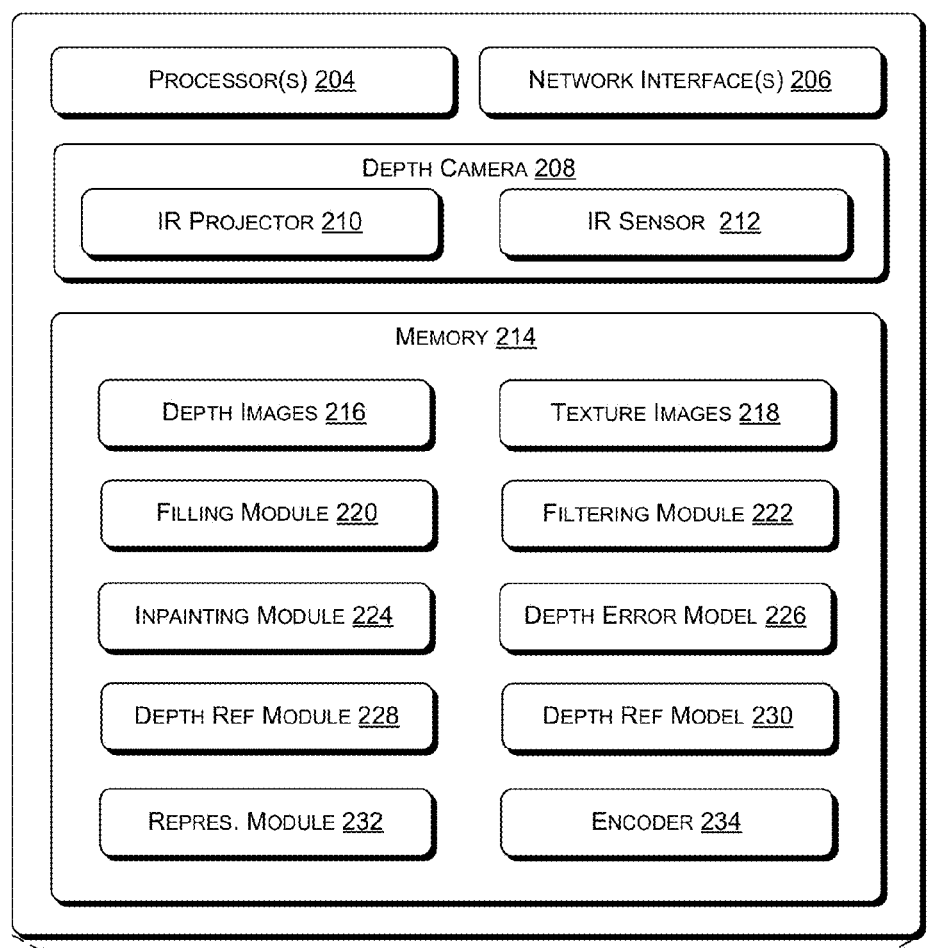
FIG. 2 illustrates an example computing device configured with functionality for setting depth values for invalid measurement regions of depth images, for filtering the depth images, and for generating reduced representations of the depth images for an encoder.
Figure 2:
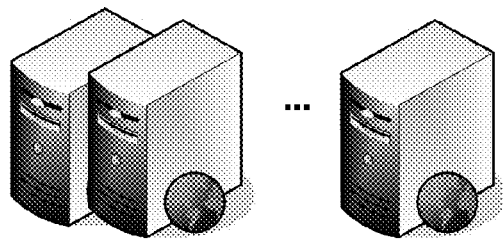

FIG. 2 illustrates an example computing device configured with functionality for setting depth values for invalid measurement regions of depth images, for filtering the depth images, and for generating reduced representations of the depth images for an encoder. As illustrated, one or more computing devices 202 (referred to as "computing device 202") include processor(s) 204, network interface(s) 206, a depth camera 208 which includes a projector 210 and sensors 212, and memory 214. The memory 214 includes depth images 216, corresponding texture images 218, filling module 220, filtering module 222, inpainting module 224, depth error model 226, depth reference module 228, depth reference model 230, representation module 232, and encoder/decoder 234.

In various embodiments, the computing device 202 may be any sort of computing device or computing devices. For example, the computing device 202 may be or include a personal computer (PC), a laptop computer, a server or server farm, a mainframe, a tablet computer, a work station, a telecommunication device, a personal digital assistant (PDA), a media player, a media center device, a personal video recorder (PVR), a television, or any other sort of device or devices. In one implementation, the computing device 202 represents a plurality of computing devices working in communication, such as a cloud computing network of nodes. When implemented on multiple computing devices (e.g., in a cloud computing system, etc.), the computing device 202 may distribute the modules and data 216-234 among the multiple devices. In some implementations, the computing device 202 represents one or more virtual machines implemented on one or more computing devices.

In some implementations, a network or networks may connect multiple devices represented by the computing device 202, as mentioned above. Also, such a network or networks may connect the computing device 202 to other devices. The network or networks may be any type of networks, such as wide area networks (WANs), local area networks (LANs), or the Internet. Also, the network or networks may be public, private, or include both public and private networks. Further, the network or networks may be wired, wireless, or include both wired and wireless networks. The network or networks may utilize any one or more protocols for communication, such as the Internet Protocol (IP), other packet based protocols, or other protocols. Additionally, the network or networks may comprise any number of intermediary devices, such as routers, base stations, access points, firewalls, or gateway devices.

In various embodiments, processor(s) 204 may include any one or more central processing units or graphic processing units. The network interface(s) 206 may support both wired and wireless connections to networks, such as cellular networks, radio, Wi-Fi networks, short range networks (e.g., Bluetooth, IR, and so forth.).

In some embodiments, the depth camera 208 is a structured light camera that comprises an IR projector 210, an IR sensor 212, and an RGB sensor 212. The IR projector 210 emits a pseudo-random light pattern by using a diffractive mask so that each speckle in the light pattern can be recognized. Depth is measured by triangulation of each speckle between the observed light pattern and the reference light pattern which is obtained by capturing a plane at a known distance and storing the captured depth in memory of the IR sensor 212. If a speckle is projected on an object whose distance to the IR sensor 212 is different from that of the reference plane, the position of the speckle received at the IR sensor 212 will be shifted in the direction of the baseline between the IR projector 210 and the perspective center of the IR sensor 212. These shifts are measured for all speckles by an image correlation procedure, which yields a depth image. The RGB sensor 212 captures an RGB image (also referred to herein as a texture image) when the IR sensor 212 captures IR light speckles.

Figure 3:
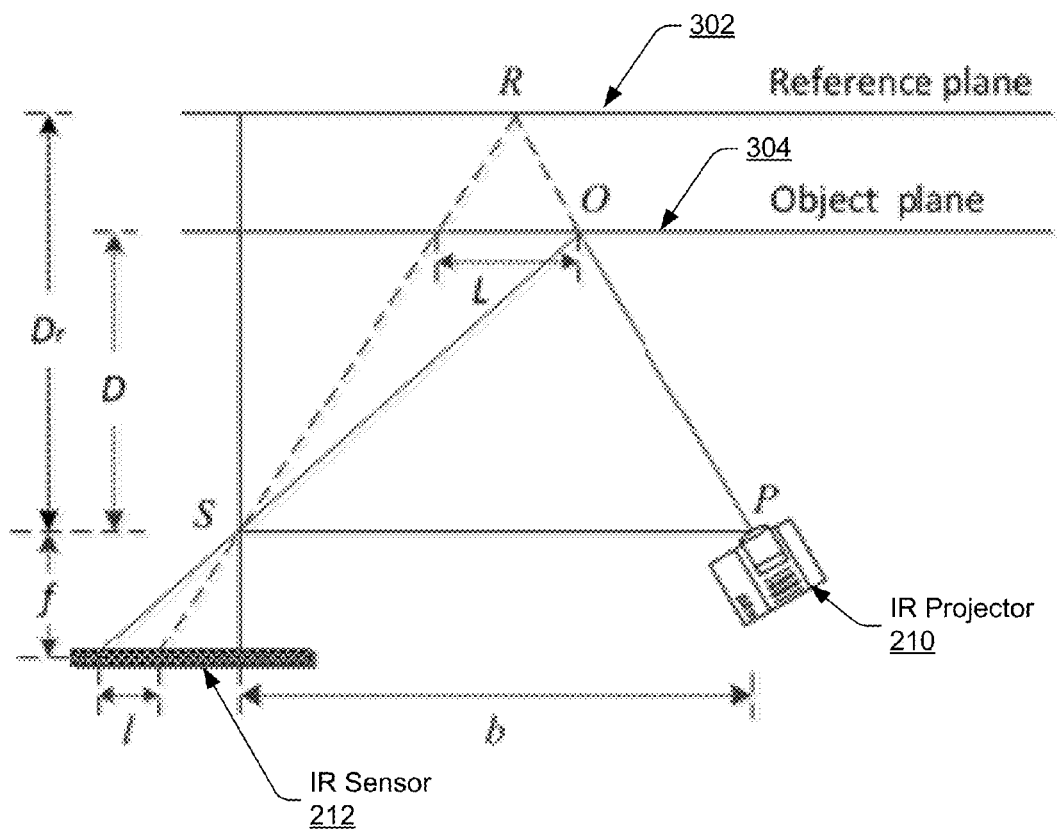
FIG. 3 illustrates an example schematic representation of a depth disparity relation between a reference plane and an object plane that is associated with depth image capture by a depth camera.

FIG. 3 illustrates in greater detail a schematic representation of a depth disparity relation between a reference plane 302 and an object plane 304 that are associated with depth image capture by the depth camera 208. Specifically, FIG. 3 shows the relation between the distance D of an object point to the IR sensor 212 and the distance $D_r$ of a reference plane 302. The origin of the depth coordinate system is located at the perspective center of the IR sensor 212, such in FIG. 3 as 'S.' According to similarity of the triangles, $$L/b=(D_r-D)/D_r$$

$$l/f=L/D$$

where f is the focal length of the IR sensor 212; l is the relative shift length (disparity); b is the base length of the depth camera 208. The depth of the object is then calculated as follows:

$$D = \frac{D_r}{1 + D_r \cdot l/(f \cdot b)}$$

These calculated depths are then used to set the depth values comprising the depth images captured by the depth camera 208.

The ideal disparity is characterized for its continuity and uniqueness, that is, the disparity varies continuously among different object surfaces and the disparity at a fixed coordinate has unique value. The derived ideal depth has the similar characteristics. However, the actual depth measured by the depth camera 208 may greatly differ from the ideal case. Such actual depth measurements may suffer from a variety of artifacts in spatial domain, like step-shaped fluctuation, deficiency and irregular impulses. Furthermore, the depth value of a certain position may change over time.

Referring again to FIG. 2, the memory 214 (and other memories described throughout) is an example of computer-readable storage media and may include volatile and non-volatile memory. Thus, the memory 214 may include, but is not limited to, RAM, ROM, EEPROM, flash memory, or other memory technology, or any other medium which can be used to store media items or applications and data which can be accessed by the computing device 202.

The memory 214 may be used to store any number of functional components that are executable on the processors 204, as well as data and content items that are rendered by the computing device 202. Thus, the memory 214 may, for example, store an operating system.

In various embodiments, memory 214 stores a sequence of depth images 216 and corresponding texture images 218. Each depth image 216 may be captured by an IR sensor 212 of the depth camera 208, as mentioned above, and each corresponding texture image 218 may be captured at substantially the same time. The depth images 216 each associate depth values representative of depth measurements with each block of the depth image 216 or with each pixel of the depth image 216. Depth values may be considered valid within a specified range (e.g., 800 mm to 4,000 mm). Depth values outside the range may be considered to be indicative of invalid depth measurements. Thus, portions of a depth image 216 that are associated with invalid depth measurements may be determined by the computing device 202 simply be examining the depth values of a depth image 216 and determining which depth block/pixel locations have depth values outside the specified range. The corresponding texture images may, in some embodiments, simply be 2D RGB images. The depth images 216 and texture images 218 may be stored in any one or more files or databases of the computing device 202.

In further embodiments, the filling module 220 may determine that a depth image 216 includes one or more portions associated with invalid depth measurements in the manner described above. Responsive to that determination, the filling module 220 may set depth values for pixels or blocks in the one or more portions based at least in part on evaluations of depth values of neighboring pixels or blocks in the depth image 216 and depth values of pixels or blocks in other depth images 216 that are time-adjacent to the depth image 216.

In some embodiments, the filling module 220 utilizes a non-local template matching algorithm for setting depth values. The depth image 216 may be specified as $I_t$ and the time-adjacent depth images 216 may be specified as $I_{t+i}$ with $i \in [-m, m]$. For an invalid depth value $I_t(x,y)$ in the current block/pixel at position (x,y), the filling module searches the corresponding blocks/pixels in the current and adjacent depth images 216. The matching criterion is to find the minimum mean square error (MSE) between the block/pixel associated with the invalid depth measurement and the corresponding blocks or pixels being searched. First, however, the filling module may set/pad the depth value of the block/pixel with the invalid depth measurement with the average depth value of the neighboring blocks/pixels. The filling module then predicts a depth value for the block or pixel with the invalid depth measurement as follows:

$$I_t(x, y) = \frac{1}{2m+1} \sum_{i=-m}^{m} \omega_i \cdot I_{t+i}(x + \Delta x_i, y + \Delta y_i)$$

where $(\Delta x_i, \Delta y_i)$ represents the motion vector for depth image $R_i$. $\omega_i$ is the weight for each reference pixel and it is defined as follows:

$$\omega_i = G_\sigma(\text{MSE}(i))$$

where $G_\sigma(x)$ denotes the 2D Gaussian kernel:

$$G_\sigma(x) = \frac{1}{2\pi\sigma^2} \exp\left(-\frac{x^2}{2\sigma^2}\right)$$

In various embodiments, after the filling module 220 has set depth values for blocks or pixels of depth images with invalid depth measurements, the filtering module 222 may normalize a depth value of a block/pixel of a depth image 216 based at least in part on depth values of the other blocks/pixels of the depth image 216 and on the depth values of the blocks/pixels in the other, time-adjacent depth images 216. The filter parameters of the filter module 222 may also be adjusted based at least in part on a depth variance of the depth value of the block/pixel.

The filtering module 222 may utilize a bilateral filter to normalize the depth values. The position of the to-be-filtered block/pixel may be specified by the filtering module 222 as p and the depth value may be specified as I(p). The local neighborhood set of p which may have influence on I(p) is denoted as S(p). Then the bilateral filter BF can be specified by the filtering module 222 as follows:

$$BF[I]_p = \frac{1}{W_p} \sum_{q \in S(p)} G_{\sigma_s}(\|p-q\|) G_{\sigma_r}(\|I(p)-I(q)\|) I(q)$$

where $W_p$ is the normalization factor and is specified as:

$$W_p = \sum_{q \in S(p)} G_{\sigma_s}(\|p-q\|) G_{\sigma_r}(\|I(p)-I(q)\|)$$

and where $\sigma_s$ and $\sigma_r$ are the filtering parameters, $G_{\sigma_s}$ is a spatial Gaussian that decreases the influence of distant blocks/pixels, and $G_{\sigma_r}$ is a range Gaussian that decreases the influence of blocks/pixels q with a large intensity difference. Since the weight of each block/pixel is determined by its position and value difference from the current block/pixel, the filtering could efficiently smooth the depth image 216 while preserving the edge. However, if the depth values are directly processed by bilateral filtering with a uniform Gaussian convolution kernel, the depth values in a small value range will be over smoothed, and noises in a large depth regions will be preserved as depth edges. In order to avoid this problem and preserve the edge information as much as possible, the filtering module 222 applies an adaptive scaling technique to the range Gaussian kernel as follows:

$$G'_{\sigma_r}(\|I(p)-I(q)\|) = \frac{1}{2\pi\sigma_r^2} \exp\left(-\frac{\left\|\frac{I(p)-I(q)}{\Theta(I(p))}\right\|^2}{2\sigma_r^2}\right)$$

where $\Theta(I(p))$ is the depth normalization error upper bounder of I(p), which is estimated using depth values statistics analysis. The difference between two blocks/pixels is then normalized by their depth range.

The high degree of correlation between time-adjacent depth images 216 can also be used by the filtering module 222 to improve normalization. This may be complicated by the motion between depth images 216, however. Fortunately, depth images 216 are smoother than natural images and an object represented in the depth images 216 can be treated as moving in a straight line, allowing the filtering module 222 to obtain the motion trajectories though the time-adjacent depth images 216. Based on these motion trajectories, the filtering module 222 identifies a corresponding block/pixel for each block/pixel in the previous and next time-adjacent depth images 216. Using the adaptive scaling bilateral filtering approach, for the to-be-filtered pixel I(p), the filtering module 222 can set the prediction windows in the previous and next time-adjacent depth images 216. The block/pixel set of the prediction windows is specified as $S_{t-j}(p)$ and $S_{t+j}(P)$, with j∈[−r, r]. r is the temporal radius of the bilateral filter, which can be different from the spatial radius. Then the block/pixel I(p) will be filtered by (2r+1) prediction windows along the time axis, $$\hat{I}(p) = \frac{1}{W_p} \sum_{j=-r}^{r} \sum_{q_i \in S_{t+j}(p)} G_{\sigma_s}(\|p-q_j\|) G'_{\sigma_r}(\|I(p)-I(q_j)\|) I(q_j)$$

If r is set to one, the pixel I(p) is normalized using the previous, current and next depth images 216.

In various embodiments, the computing device 202 may utilize other techniques to set depth values for blocks/pixels associated with invalid depth measurements. These other techniques may be referred to as "inpainting" and may be performed by the inpainting module 224. The inpainting module 224 may set the depth value for a block/pixel based on depth values of other blocks/pixels associated with the same object. Associations between blocks/pixels of the depth image 216 and objects may be based on performing object recognition on the corresponding texture image 218. The inpainting module 224 may perform an analysis on the texture image 218 to recognize objects and identify locations of edges of the objects. The inpainting module 224 may then utilize the locations of edges from the texture image 218 to classify the depth image into smooth regions and edge regions based on whether a given block/pixel being classified is at least a threshold distance from a location of an edge. Blocks/pixels of a smooth region of an object have their depths set based on the depth values of other blocks/pixels in the same smooth region of the same object. The edge regions are divided into segments based on the location of the edge, and blocks/pixels of a segment of an edge region have their depths set based on the depth values of other blocks/pixels in the same segment of the same edge region.

In some embodiments, as mentioned the inpainting module 224 first identifies object edges in the texture images 218. For example, the canny operator algorithm or other object recognition algorithms may be used to extract object edges with a one-pixel width. These edge-pixel locations may then be used in classifying the blocks of the depth image 216.

The ideal depth map of a depth image 216 should be continuous in most parts of the map besides the discontinuity between two objects. Based on this characteristic, the inpainting module 224 handles the smooth regions of the depth image 216 differently from the edge regions. For smooth regions, high-order partial differential equations (PDEs) are employed, since these equations can perform well in determining depth values. For edge region, revised PDEs designed for jointly considering hole-filling and edge alignment are used.

In some embodiments, Laplace equations may be adopted as one of the PDE methods of the inpainting module 224. The continuous form of the Laplace equation is as follows:

$$\frac{\partial I}{\partial t} = \Delta I$$

where $\Delta = (\partial^2)/(\partial x^2) + (\partial^2)/(\partial y^2)$ is known as the Laplacian operator. In a continuous case, the solver is essentially convolving the initial state with a Gaussian kernel with variance t, such that $$I(x,y,t) = I(x,y,0) \circledast G(x,y,t)$$

This relation reveals that the Laplace equation is capable in generating smooth regions. Specifically, the discrete form of the Laplace equation is:

$$I(x,y,t+1) = I(x,y,t) + c(x,y,t) \cdot \Delta I$$

Until convergence, i.e., $\|I(t+1)-I(t)\|$ less than a threshold, the state I(t+1) is regarded as the solution. Note that c(x,y,t) as the step size can vary in iterations but should only ensure the convergence.

In further embodiments, the Laplace equation may be estimated as follows:

$$\mathcal{L}I(x, y) = \sum_{(i,j) \in \mu_8(x,y)} \kappa(i, j)(I(i, j) - I(x, y))$$

where $\mu_8(x,y)$ involves eight neighboring pixels of (x, y) and $\kappa(i,j)$ is an indicator function that is evaluated to one for available pixels and zero for unavailable ones. By setting the step size to $$c(x, y, t) = c(x, y) = \left( \sum_{(i,j) \in \mu_8(x,y)} \kappa(i, j) \right)^{-1}$$

the inpainting module 224 obtains the following formula:

$$I(x, y, t+1) = c(x, y) \sum_{(i,j) \in \mu_8(x,y)} \kappa(i, j) I(i, j, t)$$

The texture image 218 usually possesses an edge map similar to that of the corresponding depth image 216 but not exactly equivalent. If the object physical features are preserved in the texture map, it is possible that the depth and the texture share the same edges after calibration. However, the smooth surface could be covered by complicated texture, and the depth discontinuity might be neglected by low contrast in texture.

For that reason, the inpainting module 224 categorizes edge relations of a depth image 216-texture image 218 pair to one of four cases. In Case 1, both a texture edge and a depth edge exist at a given block. In Case 2, a texture edge exists at a given block, but no depth edge exists at that block. In Case 3, no edge exists at the given block in either the depth image 216 or the texture image 218. In Case 4, no texture edge exists at a given block, but a depth edge does exist at that block. Since the depth map is noisy and instable in comparison with the texture, the inpainting module 224 partitions/classifies the depth image 216 based on available texture edges. For the first two cases, the region is regarded as edge region no matter whether depth edges exist or not. Since the edge region inpainting is a more severe scheme than PDEs, it works well for the first and second cases. As mentioned above, the partitioning/classifying may first occur on a block-level. The blocks are classified into one of two categories, edge regions and smooth regions, based on whether or not the blocks contain texture edges.

For the smooth region blocks, the key problem is whether the information in the neighbor blocks is enough and credible for inpainting/depth-setting. For small invalid depth measurement regions, since there exists enough available pixels in neighbors, the depth values for invalid depth measurement region can be set based on Laplace equations. For large invalid depth measurement regions, if the depth values of the neighbor pixels are near the upper bound of depth range, the invalid depth measurement region might be generated as a result of being outside the depth range. Since the Laplace equations can describe the trend of depth in a smooth region, the impaitning module 224 can predict the depth value by expanding the depth region from the available side. Also for large invalid depth measurement regions, if the depth value of the neighbor is within the valid range, the light speckle of the invalid depth measurement region may missed due to depth discontinuity or specular reflection. That means this region might not be smooth in depth, regardless of whether there is a texture edge extracted as mentioned above in Case 4. Therefore, such an invalid depth measurement region may not benefit from the techniques of the inpaiting module 224 since the information from the neighboring pixels is not enough to predict and set the depth value.

In some embodiments, in order to judge if the neighboring information is enough for inpainting/depth-setting, the inpainting module 224 measures the number of available pixels in the block. If the ratio is beyond a threshold (e.g. 20%) the block is set as an available block; otherwise it is set as an unavailable block. For the available blocks, the average of depth value of pixels in the block is calculated. If the average is near the upper bound of depth range, the block is named as an upper bound block. The inpainting module 224 then investigate the eight neighboring blocks, and determines whether these neighbors provide enough information. If the neighboring blocks provide enough information, the inpainting module 224 uses the above-described PDE Laplace equations to evaluate the depth values of the pixels of neighbor blocks in the same smooth region associated with the same object and sets the depth values of pixels of a given block based on the results of the PDE Laplace equations.

For the edge region blocks, the inpainting module 224 first addresses the depth edge fattening or shrunk effects which commonly exist along the boundary of a foreground object. To address these effects, the inpainting module 224 performs edge alignment. Edge alignment involves creation and application of a fluctuating edge region, which is located beside the texture edges. The inpainting module 224 generates this region in the following manner: for each texture edge in an edge region block, the edge direction k is determined based on its slope. The fluctuating edge region is extended along the direction $k^\perp$, perpendicular to the direction k. The progress of the expansion will stop if another texture edge is met or the width is beyond a threshold. The pixels in this region are treated as being an invalid depth measurement region before inpainting/depth-setting. The inpainting/depth-setting is performed in the direction $k^\perp$ from outer pixel to interior pixel and is stopped when meeting the texture edge. The pixel updating process can be depicted by following formula:

$$I(x,y,t+1) = \chi(x,y,t+1) \cdot I(x,y,t) + (1 - \chi(x,y,t+1)) \cdot R(x,y,t+1)$$

where $R(x,y,t+1)$ is the pixel value calculated based on PDEs, and $$\chi(x, y, t+1) = \begin{cases} 0 & \text{if} |I(x, y, t) - R(x, y, t+1)| > \alpha \\ 1 & \text{otherwise} \end{cases}$$

where $\alpha$ is the maximum tolerable difference. The final updated depth value of a pixel in an edge region block is the weighted sum of original value $I(x,y,t)$ and inpainting value $R(x,y,t+1)$. Here the weight coefficient is set as one indicator function $\chi(x,y,t+1)$. That means the depth value is modified to the inpainting depth value if the difference is beyond the threshold, otherwise it is kept as an original depth value. In this way, the depth value will propagate from the smooth region and stop beside the texture edge. Finally, the depth edge will match with the texture edge.

In various embodiments, following denoising, filtering, and/or inpainting, or independently of such techniques, the computing device 202 may generate reduced representations of depth images 216 and provide such reduced representations to an encoder for compression. In generating the reduced representations, the computing device 202 may utilize a depth reference model and a depth error model.

In some embodiments, the depth error model 226 is such a model as may be used by the computing device 202 to generate the reduced representations. The depth error model 226 includes one or both of a depth normalization error or a depth identification error, as well as a depth variance associated with a depth value of each pixel of a depth image 216. Depth error and its associated depth variance may result from any of a number of sources. Such sources may include sensor errors, light condition interference, imaging geometry, and disparity normalization.

In order to model depth error, the disparity error is first formulated according based on an analysis of disparity:

$$\hat{l} = l + r_d + r_n$$

where l indicate the true disparity map and $\hat{l}$ is the disparity generated for depth deviation. $r_d$ is the disparity error introduced by the light pattern misidentification and $(l+r_d)$ indicates the raw disparity map recognized by the IR sensor 212 before normalization. The raw disparity length is normalized during the depth measurement, and $\hat{l}$ can be substituted by (ml*+n), with l* being the normalized disparity and m,n the parameter of normalized disparity. $r_n$ is the normalization error caused by disparity round-off and equals −n, with $r_n \in [-l^*, 0]$. According to the causes of different type disparity error, $r_n$ is a random variable with uniform distribution and is dependent on the raw disparity $(l+r_d)$, while $r_d$ is assumed to be a normally distributed variable with finite variance and zero mean. The variance of $r_d$ is highly relevant to the light interference intensity. The higher the light intensity, the larger the dynamic variation range of $r_d$.

Besides inaccurate disparity measurement, the disparity detection failure also appears frequently, and thus the depth information in the corresponding regions is inaccessible. In combination of the main affecting factors on depth measurement, the relation between the measured depth $\tilde{D}$ and the true depth D can be formulated as follows, $$\tilde{D} = M \cdot (D + e)$$

where M denotes the disparity mask, indicating whether the disparity value is valid at that position, and e is the depth measurement error caused by degradation of disparity. In the region with valid depth values, the error between the true depth and the output depth is $$e = \tilde{D} - D = \frac{r_d + r_n}{f \cdot b} D\tilde{D}$$

The depth error can be decomposed to identification error $e_d$ and normalization error $e_n$ in terms of their origins. Assuming $\tilde{D} - D \ll \tilde{D}$, the true depth D can be replaced by $\tilde{D}$ for approximation. Since the focal length and base length are both constant for measuring depth, $C_0$ is used to represent the constant factor 1/fb. e is then specified as:

$$e = e_d + e_n$$

with $e_d = C_0 \tilde{D}^2 r_d$ and $e_n = C_0 \tilde{D}^2 r_n$. Note that the level of the error $e_d$ and $e_n$ is proportional to the square of the corresponding depth value. The difference between time-adjacent depth images 216 is partially introduced by the normalization, but the underlying cause is time-variant identification error. The upper bound of normalization error is, $$\Theta(\tilde{D}) = C_0 \tilde{D}^2 l^*$$

Since the depth difference at a fixed position is mainly caused by the variation of disparity error, the level of depth difference is also proportional to the square of the corresponding depth value.

In addition to the depth error model 226, the memory 214 includes a depth reference module 228 to generate a depth reference model 230 for a sequence of depth images 216. The memory 214 may then also store that depth reference model 230. The depth reference model 230 is generated from volumetric integration of the depth images 216.

As a typical representation of range data, measured depth can be utilized to reconstruct 3D object surfaces. Since the 3D surfaces are generated upon tremendous data accumulation, the random error of data can be corrected during the reconstruction. Among various surface reconstruction techniques, the volumetric integration is widely applied for surface reconstruction upon range data. The combination rules of volumetric integration can be described by the following equation:

$$T(x) = \frac{\Sigma w_i(x) d_i(x)}{W(x)}$$

with $W(x) = \Sigma w_i(x)$. $d_i(x)$ is the signed distance of each point x to the i-th range surface along the line of sight to the IR sensor 212, and $w_i(x)$ is a weight function dependent on the angle between the vertex normal and the viewing direction. The continuous implicit function T(x) is presented on a dictate voxel grid, and the isosurface is extracted corresponding to D(x)=0. The range images captured at different time slot may be specified as $R_{t-1}$ and $R_t$. If the viewing direction is perpendicular to the range surface, the corresponding signed distance is $d_t(x) = x - R_t$ and the weight $w_t(x) = 1$. The isosurface is obtained when $x = (R_{t-1} + R_t)/2$. If this derivation extends to multiple range images, the range of the isosurface should be the average of each range images, specified as follows:

$$x_0 = \frac{1}{n} \Sigma R_i, \text{ with } T(x_0) = 0$$

with n being the number of the range images. Although the integrated surface can provide a stable reference for depth prediction, the volumetric representation of range images requires a large amount of memory and computation. To save on memory and computation, depth volume is used to simulate the 3D volume under the assumption that the viewing direction is perpendicular to all range surfaces. Since the depth is the distance between the object and the baseline instead of depth camera 208, the upper assumption can be satisfied.

The pseudocode "Listing 1" (shown below) illustrates the main operations of the volumetric integration performed by the depth reference module 228. Depth volume (DV) is specified as a three-dimensional depth buffer in which each voxel represents the historic depth value at a certain position (pos). Firstly, comparison is implemented between the current reconstructed depth $D_k^*$ and the previous reconstructed depth $D_{k-1}^*$ to evaluate the activity of each depth pixel. If the pixel difference is smaller than the product of constant α and the normalization error bound $\Theta(\cdot)$, the pixel of the current reconstructed depth will be regarded as an inactive pixel whose value will be loaded into the depth volume and stored behind the previous recorded depth value. The corresponding counter Cnt(pos) is incremented by one. Otherwise, the pixel is taken as an active pixel, whose value will be recorded as the fresh value located at the front of the array. Meanwhile, the counter at that position is reset to one. If the number of the similar depth values at a position is large enough, the average of the historic depth value is loaded to k-th depth reference $Dr_k$ of the depth reference model 230. The constant $\alpha$ is proportional to the intensity of light inference.

Listing 1 Depth reference generation

```
1: for each pixel in the k-th reconstructed depth D_k*
2:   if |D_k*(pos) − D_{k−1}*(pos)| < α • Θ(D_k*(pos)) then
3:     Cnt(pos) ← Cnt(pos) + 1
4:     DV(pos, Cnt(pos)) ← D_k*(pos)
5:   else
6:     Cnt(pos) ← 1
7:     DV(pos, Cnt(pos)) ← D_k*(pos)
8:   if Cnt(pos) ≥ Cnt_threshold(pos)
9:     Dr_k(pos) ← Average of DV (pos)
```

In various embodiments, once the depth error model 226 and depth reference model 230 have been constructed, the representation module 232 may generate reduced representations of the depth images 216 based on the depth error model 226 and the depth reference model 230. Before generating the representations, though, the representation module 232 may first generate a binary mask of the sequence of depth images 216 and perform lossless encoding on the binary mask. The binary mask is a mask of the depth image 216 before any denoising, filtering, or inpainting to enable a decoder receiving the binary mask to reconstruct the original depth measurements of the depth images 216. The lossless encoding may be performed using a binary signal encoder (e.g., JBIG).

After generating the binary mask, the representation module 232 generates the reduced representations of the depth images 216. The representation module 232 generates the reduced representations based in part on the depth reference model 230 in order to remove the static background from the depth images 216. In some embodiments, this may involve performing a Boolean subtraction of the depth reference model 230 from the depth images 216. The resulting reduced representation specifying motion relative to the stable surfaces of the depth reference model 230 is then passed to an encoder 234 performing, for example, 2D prediction, and the final residual is encoded by residual coding.

In some embodiments, if the depth value difference between a block/pixel of a depth image 216 and that of a neighboring depth image 216 is less than a threshold, such as the depth variance specified in the depth error model 226, that block/pixel is represented by the depth reference model 230. If the difference meets or exceeds the threshold, then that block/pixel will be passed to next step for 2D prediction. The depth reference model 230 is also transmitted to the encoder after generation.

Upon receiving the reduced representations, the encoder 234 may compress the reduced representations of the depth image 216 and the depth reference model 230 for storage and/or transmission. The encoder 234 may be any sort of encoder, such as a 2D video encoder, a video/image coding scheme, like H.264/AVC, MPEG-2 or JPEG, etc.

In some instances, the computing device 202 may have features or functionality in addition to those that FIG. 2 illustrates. For example, the computing device 202 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device 202 may reside remotely from the computing device 202. In such implementations, the computing device 202 may utilize the network interfaces 206 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 4:
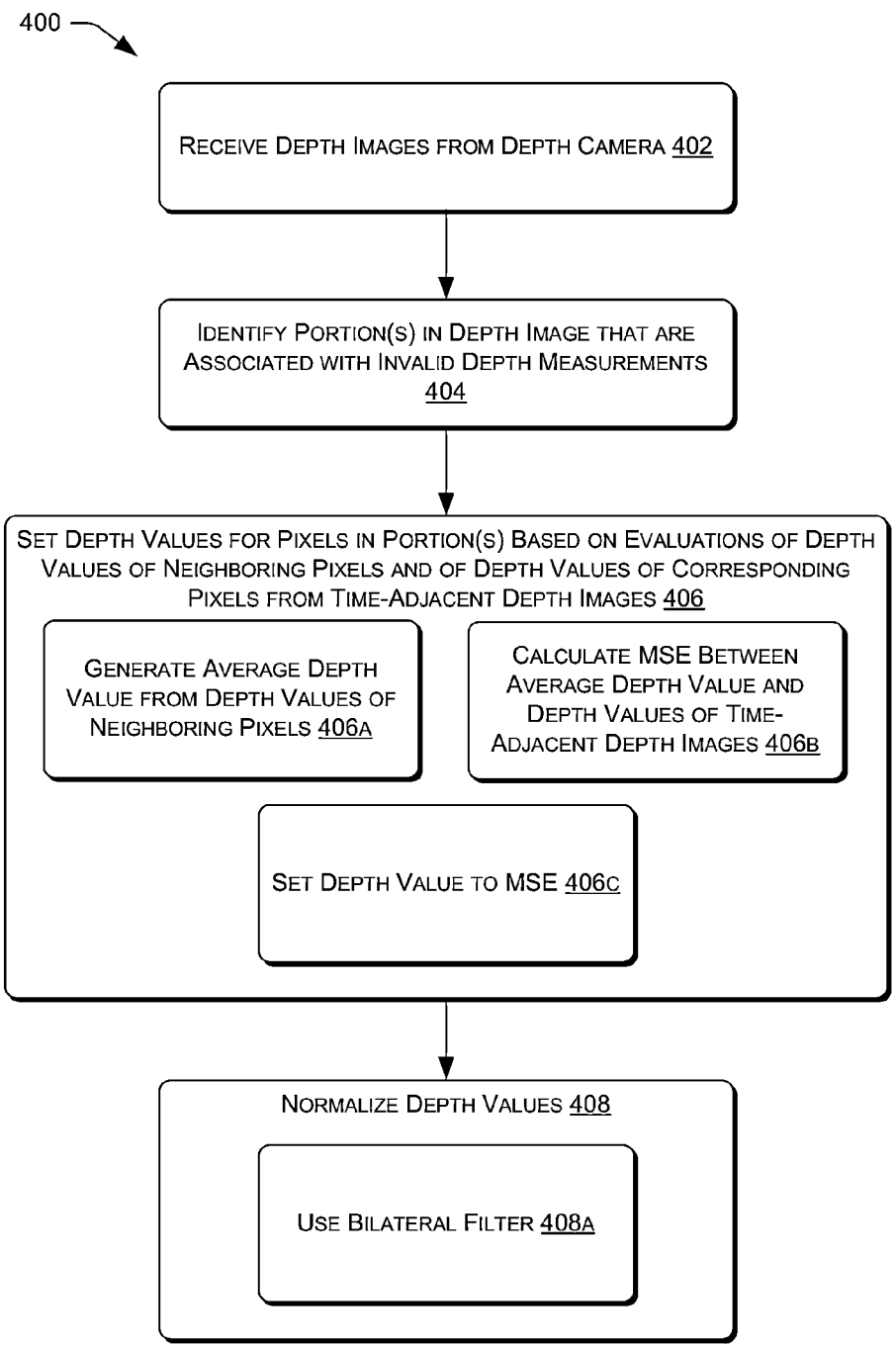
FIG. 4 illustrates an example process for setting depth values for an invalid measurement region of a depth image based on neighboring pixels from the depth image and corresponding pixels from time-adjacent depth images and for normalizing the depth values of the depth image.

FIG. 4 illustrates an example process 400 for setting depth values for an invalid measurement region of a depth image based on neighboring pixels from the depth image and corresponding pixels from time-adjacent depth images and for normalizing the depth values of the depth image. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 400 includes, at 402, receiving, by a computing device, a sequence of depth images captured by a depth camera. The depth images may depict the same location over a period of time. At 404, the computing device may identify one or more portions of a depth image that are associated with invalid depth measurements. These portions are also referred to herein as "invalid measurement regions" and "depth holes."

At 406, the computing device may set depth values for pixels included in the one or more portions based on evaluations of depth values of neighboring pixels in the depth image and/or based on evaluations of depth values of corresponding pixels in time-adjacent depth images. At 406a, setting the depth values may include averaging the depth values of the neighboring pixels and setting the depth values to the averaged depth values. This is also referred to herein as "padding" the depth values of the portions. At 406*b*, the computing device may then calculate minimum mean square errors between the averaged depth values and depth values of corresponding pixel blocks of the other, time-adjacent depth images. At 406*c*, the computing device may then set the depth values of the pixels in the portions based at least in part on the minimum mean square errors.

At 408, the computing device may normalize depth values of pixels of the depth image based at least in part on depth values of other pixels of the depth image and on depth values of the pixels in other, time-adjacent depth images. In some embodiments, to improve the normalization, filter parameters of a filter module of the computing device are adjusted based at least in part on depth variances of the depth values of the pixels. At 408*a*, the computing device may utilize a bilateral filter to normalize the depth values.

Figure 5:
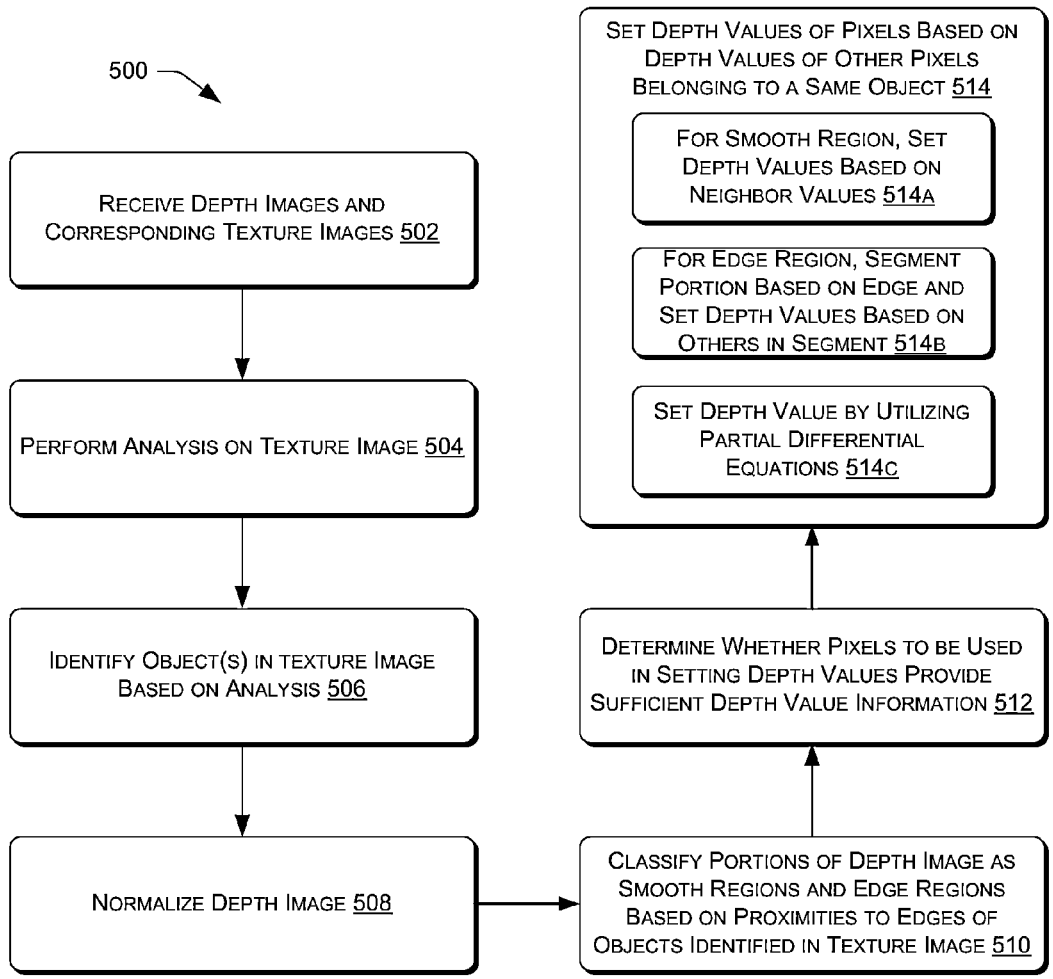
FIG. 5 illustrates an example process for setting depth values for an invalid measurement region of a depth image based at least on depth values of other pixels belonging to the same object as pixels of the invalid measurement region, the locations of the object determined by analysis of a texture image that corresponds to the depth image.

FIG. 5 illustrates an example process 500 for setting depth values for an invalid measurement region of a depth image based at least on depth values of other pixels belonging to the same object as pixels of the invalid measurement region, the locations of the object determined by analysis of a texture image that corresponds to the depth image.

The process 500 includes, at 502, receiving, by a computing device a plurality of depth images and corresponding texture images, at least one of the depth images including a portion associated with an invalid depth measurement.

At 504, the computing device may perform an analysis on a texture image that corresponds to the depth image which includes the portion associated with the invalid depth measurement. At 506, the computing device identifies object in the texture image based on the analysis. In some embodiments, the analysis includes performing object recognition on the texture image and determining locations of edges depicted in the texture image, the edges separating objects from each other or from a background.

At 508, the computing device may normalize the depth image that includes the portion with the invalid depth measurement. In some embodiments, prior to normalizing the depth image, the computing device may pad the portion with the invalid depth measurement with averaged depth values of neighboring pixels.

At 510, the computing device may classify portions of the depth image based on the identified objects in the texture image. Portions near a determined object edge are classified as edge regions and portions that are more than a threshold distance from an object edge are classified as smooth portions. The computing device may initially classify the portions of the depth image in a block-by-block manner and then adjust classifications of pixels within blocks based on the locations of the object edges.

At 512, the computing device may then determine whether the other pixels to be used to set the depth values of the pixels included in the portion provide sufficient depth value information. At 514, responsive to determining that the other pixels provide sufficient depth value information, the computing device set depth values of pixels in the portion based on depth values of other pixels belonging to the same object. At 514*a*, for pixels in a smooth region, the setting includes setting the depth values based at least in part on depth values of neighboring depth image locations of the portion, the neighboring depth image locations also being included in the smooth region. At 514*b*, for pixels in an edge region, the setting includes determining segments of the portion on each side of an edge and setting depth values in those segments based on depth values of neighboring depth image locations on the same side of the edge. At 514*c*, the computing device sets the depth values of the one or more pixels in the portion based at least in part on the depth values of the other pixels by utilizing partial differential equations to evaluate the depth values of the other pixels.

Figure 6:
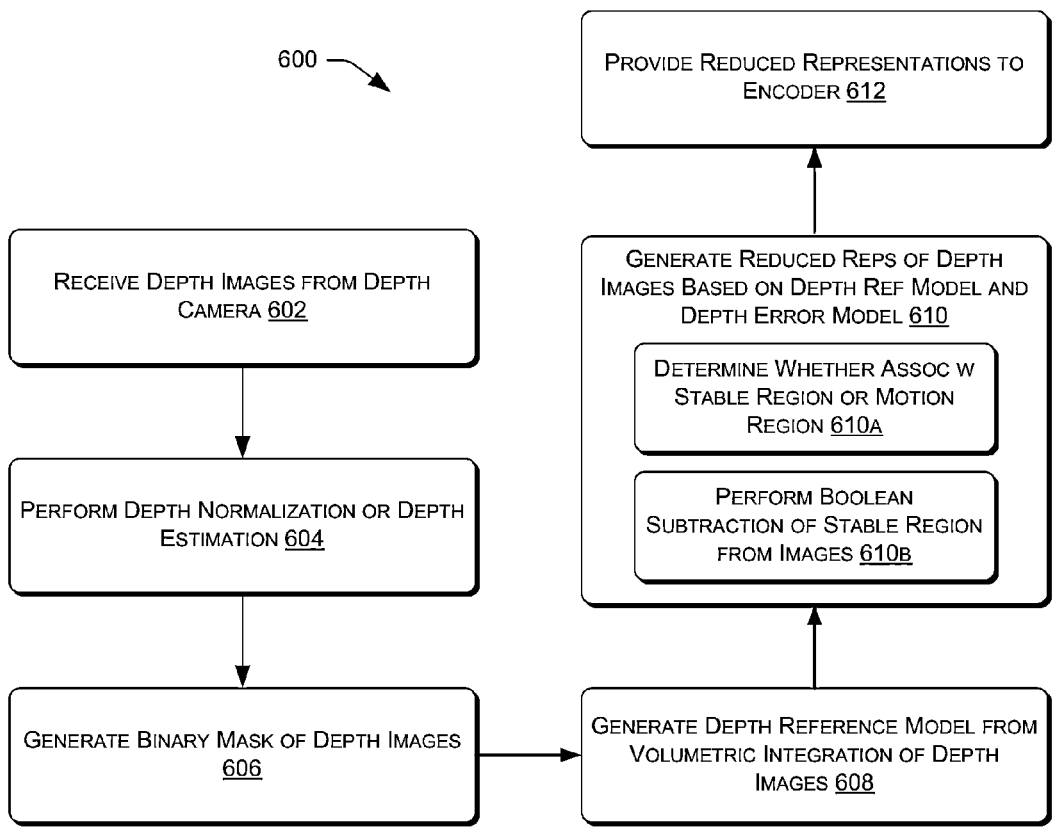
FIG. 6 illustrates an example process for generating reduced representations of depth images based at least in part on a depth reference model and on a depth error model and for providing the reduced representations to an encoder.

FIG. 6 illustrates an example process 600 for generating reduced representations of depth images based at least in part on a depth reference model and on a depth error model and for providing the reduced representations to an encoder.

The process 600 includes, at 602, receiving, by a computing device, a sequence of depth images captured by a depth camera.

At 604, the computing device performs at least one of depth normalization or depth estimation on at least a portion of a depth image of the sequence of depth images. Such depth normalization or depth estimation may involve either or both or process 400 or process 500.

At 606, the computing device may generate a binary mask of the sequence of depth images, perform lossless encoding on the binary mask, and provide the encoded binary mask to a decoder to enable reconstruction of the sequence of depth images.

At 608, the computing device may generate a depth reference model from a volumetric integration of the sequence of depth images. The volumetric integration may include determining a stable depth value for a location across a number of the depth images and associating the stable depth value with the location in the depth reference model At 610, the computing device may generate reduced representations of depth images of the sequence of depth images based at least in part on the depth reference model and on a depth error model, the reduced representations retaining depth values associated with motion relative to the depth reference model. The depth error model includes one or both of a depth normalization error or a depth identification error. At 610*a*, generating the reduced representations comprises determining for each location in a depth image whether the location is associated with a stable depth region or a motion region. A location is determined to be associated with a stable depth region when the depth value associated with the location is within a threshold distance of the depth reference model, the threshold distance determined based on the depth error model. At 610*b*, generating the reduced representations comprises performing a Boolean subtraction of one or more stable depth regions from the sequence of depth images.

At 612, the computing device provides the reduced representations to an encoder to generate compressed representations of the depth images.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A system comprising:
   one or more processors;
   a filling module configured to be executed by the one or more processors to determine that a depth image of a plurality of depth images includes one or more portions associated with invalid depth measurements and to set depth values for pixels in the one or more portions based at least in part on evaluations of depth values of neighboring pixels in the depth image and depth values a block of pixels in other depth images of the plurality of depth images that are located in time-adjacent frames to the depth image, wherein the plurality of depth images comprise three-dimensional images captured by a depth camera and wherein the block of pixels is associated with a same object as the pixels in the one or more portions; and a filter module configured to be executed by the one or more processors to normalize a depth value of a pixel of the depth image based at least in part on depth values of the other pixels of the depth image and on the depth values of the pixels in the other, time-adjacent depth images, wherein filter parameters of the filter module are adjusted based at least in part on a depth variance of the depth value of the pixel.

2. The system of claim 1, wherein the filling module sets the depth values for pixels in the one or more portions by:
averaging depth values of the neighboring pixels to generate an averaged depth values, and
calculating a minimum mean square error between the averaged depth value and one or more depth values of the block of at least one of the other, time-adjacent depth images, wherein a location of the block corresponds to a location reflecting motion of the object.

3. The system of claim 1, wherein the filter module utilizes a bilateral filter to normalize the depth value.

4. A computer-implemented method comprising:
receiving a plurality of depth images and corresponding texture images, at least one of the depth images including a portion associated with an invalid depth measurement, wherein the plurality of depth images are received from a depth camera configured to capture three-dimensional depth images and the corresponding texture images comprise two-dimensional (2D) images corresponding to the respective depth images; and
setting depth values of one or more pixels in the portion based at least in part on depth values of other pixels of the at least one depth image and depth values of other pixels in a depth image located in a time-adjacent frame to the at least one depth image, the other pixels being associated with a same object as the one or more pixels and having a location reflecting motion of the object, the object being identified based on an analysis of one of the texture images that correspond to the at least one depth image and to the depth image located in the time-adjacent frame to the at least one depth image.

5. The method of claim 4, wherein the analysis of the one of the texture images includes performing object recognition on the texture image and determining locations of edges depicted in the texture image, the edges separating objects from each other or from a background.

6. The method of claim 5, further comprising classifying portions of each depth image as smooth regions or edge regions based at least in part on distances of the portions from the depth image locations that correspond to the determined locations of the edges.

7. The method of claim 6, further comprising determining that the portion associated with the invalid depth measurement is a smooth region and, in response, setting the depth values of the portion based at least in part on depth values of neighboring depth image locations of the portion, the neighboring depth image locations also being included in the smooth region.

8. The method of claim 6, further comprising determining that the portion associated with the invalid depth measurement is an edge region and, in response, determining segments of the portion on each side of an edge and setting depth values in those segments based on depth values of neighboring depth image locations on the same side of the edge.

9. The method of claim 5, further comprising, prior to setting the depth values, performing depth normalization on the at least one of the depth images.

10. The method of claim 5, further comprising determining whether the other pixels provide sufficient depth value information for setting the depth values of the one or more pixels in the portion and performing the setting conditionally based at least in part on the determining.

11. The method of claim 5, wherein setting the depth values of the one or more pixels in the portion based at least in part on the depth values of the other pixels includes utilizing partial differential equations to evaluate the depth values of the other pixels.

12. A device comprising:
a processor; and
one or more memory devices storing a plurality of instructions executable by the processor to perform operations comprising:
receiving a sequence of depth images and corresponding texture images, at least one of the depth images including a portion associated with an invalid depth measurement, wherein the sequence of depth images are received from a depth camera configured to capture three-dimensional depth images and the corresponding texture images comprise two-dimensional (2D) images corresponding to the respective depth images; and
setting depth values of one or more pixels in the portion based at least in part on depth values of other pixels of the at least one depth image and depth values of other pixels in a depth image located in a time-adjacent frame to the at least one depth image, the other pixels being associated with a same object as the one or more pixels and having a location reflecting motion of the object, the object being identified based on an analysis of one of the texture images that corresponds to the at least one depth image and to the depth image located in the time-adjacent frame to the at least one depth image.

13. The device of claim 12, wherein the analysis of the one of the texture images includes performing object recognition on the texture image and determining locations of edges depicted in the texture image, the edges separating objects from each other or from a background.

14. The device of claim 13, the operations further comprising classifying portions of each depth image as smooth regions or edge regions based at least in part on distances of the portions from the depth image locations that correspond to the determined locations of the edges.

15. The device of claim 14, the operations further comprising determining that the portion associated with the invalid depth measurement is a smooth region and, in response, setting the depth values of the portion based at least in part on depth values of neighboring depth image locations of the portion, the neighboring depth image locations also being included in the smooth region.

16. The device of claim 14, the operations further comprising determining that the portion associated with the invalid depth measurement is an edge region and, in response, determining segments of the portion on each side of an edge and setting depth values in those segments based on depth values of neighboring depth image locations on the same side of the edge.

17. The device of claim 13, the operations further comprising, prior to setting the depth values, performing depth normalization on the at least one of the depth images.

18. The device of claim 13, the operations further comprising determining whether the other pixels provide sufficient depth value information for setting the depth values of the one or more pixels in the portion and performing the setting conditionally based at least in part on the determining.

19. The device of claim 13, wherein setting the depth values of the one or more pixels in the portion based at least in part on the depth values of the other pixels includes utilizing partial differential equations to evaluate the depth values of the other pixels.

20. The device of claim 17, wherein the depth normalization is performed using a bilateral filter.

\* \* \* \* \*